Nov. 28, 1939. J. W. GEDDES 2,181,301
BOLT LOCK
Filed Feb. 16, 1937
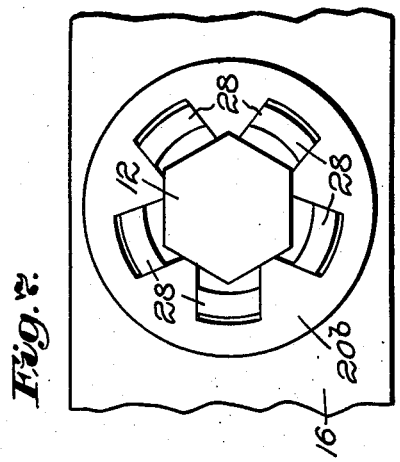
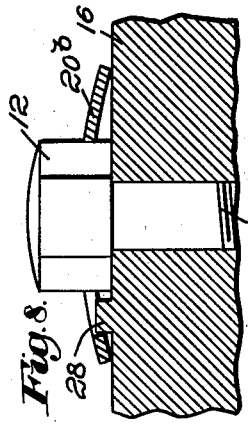
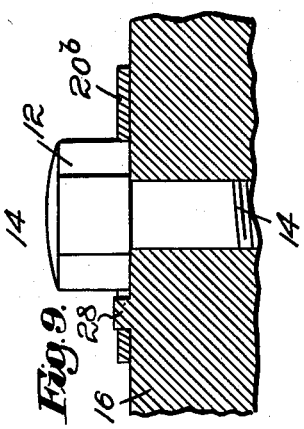
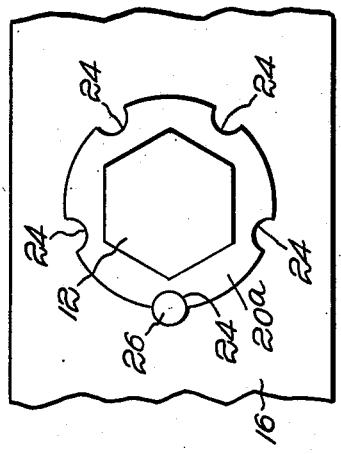
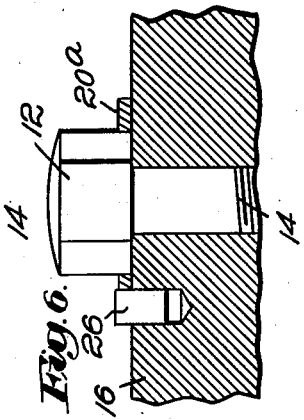
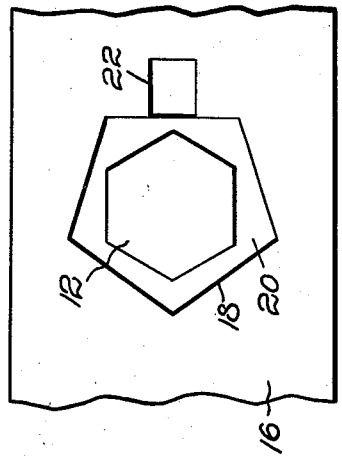
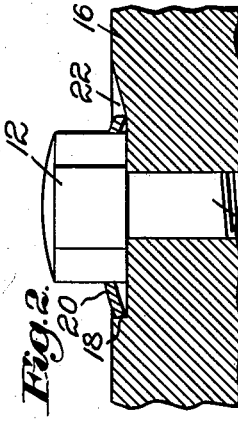
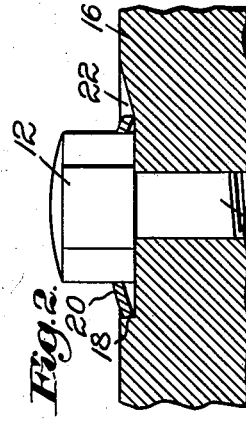
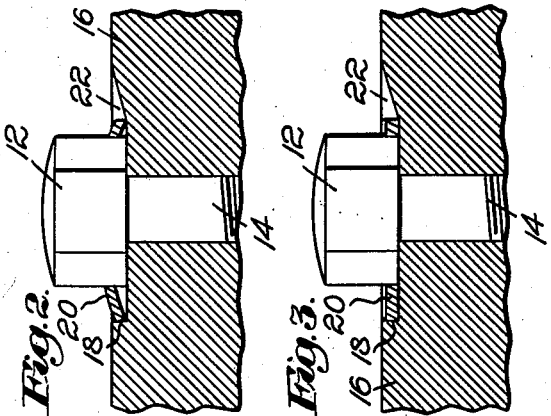
Inventor:
John W. Geddes,
Attys Patented Nov. 28, 1939

2,181,301

UNITED STATES PATENT OFFICE 2,181,301

BOLT LOCK

John W. Geddes, Watertown, Mass., assignor to H. K. Porter, Inc., Everett, Mass., a corporation of Massachusetts Application February 16, 1937, Serial No. 126,001

11 Claims. (Cl. 151—32)

This invention relates to bolt locks and the object is to provide a device for application to a bolt head, by which term I include a removable head, that is, a nut, to prevent turning of the same after the bolt is set up on a piece of work.

My invention will be well understood by reference to the following description taken in connection with the accompanying drawing showing several illustrative embodiments of the invention, wherein:

Figs. 1, 4 and 7 are plan views illustrating three several modifications;

Figs. 2, 5 and 8 are vertical sections of Figs. 1, 4 and 7 respectively showing the locking device in position but not secured; and Figs. 3, 6 and 9 are vertical sections corresponding to Figs. 2, 5 and 8 respectively showing the parts in locked position.

Referring to the modification shown in Figs. 1, 2 and 3, I have there shown a bolt having a head 12 with a non-circular periphery, herein of the ordinary hexagonal form, and a shank 14 penetrating a piece of work 16. Herein the head 12 is shown as entering a recess 18 encircling the bolt-receiving opening presenting inwardly facing ridges facing the bolt head, which recess in the example shown is of a regular pentagonal form. To lock the bolt against turning relatively to the work I provide an annulus 20 having an interior periphery of hexagonal form of approximately the size of the head and an exterior periphery of pentagonal form similar to and of approximately the size of the recess 18. This annulus is initially dished as shown in Fig. 2. The annulus 20 is not a washer and is not received under the head of the bolt, but on the contrary in its initially dished form may by a movement of axial approach be freely placed in encircling relation to the bolt head after the bolt is set up against the work and will be received with an easy fit between the head 12 and the encircling ridge formed by the margin of the recess 18, as illustrated in Fig. 2.

It will be noted that the engagement of the annulus 20 with the bolt head and with the work 16 is along lines or joints which are not centric with the axis of the bolt, that is, along lines at least in part differing from a circular arc centered on the axis of the bolt, and since the work 16 may be considered fixed it is clear that the annulus and the bolt head are incapable of rotation relative thereto. To lock the parts in this condition the dished annulus 20 may be more or less flattened out by axial pressure applied thereto, as illustrated in Fig. 3, being squeezed into the space between the head 20 and the ridges or abutments provided by the wall of the recess 18, and is thus placed under a radial stress by which it is secured in position. This stress may either be, as illustrated in Fig. 3, a stress between the bolt head 12 and the radially remote abutments on the work or a stress against either of these parts. Thus, if the annulus has a considerable clearance from the bolt head, it may be stressed between the wall of the recess and its inner peripheral zone without tightly engaging the bolt head itself although the straight lines of its inner periphery presented to the flats of the head will prevent rotation of the latter. Conversely the annulus may be stressed between the bolt head and its outer peripheral zone.

In case it is desired to remove the locking annulus to permit unscrewing of the bolt in cases where the locking annulus is disposed inwardly of the surface of the work, as in Fig. 3, the face of the work 16 may be provided with a groove 22 opening to the recess to provide for the insertion of a prying tool beneath the annulus. In the absence of such a device the removal of the annulus in the form shown in Figs. 1, 2 and 3 would be difficult and this may be taken advantage of in utilizing the locking device as a seal to prevent or disclose tampering. Such a seal would be particularly effective if the annulus is made of a soft metal not adapted to withstand the action of prying tools or the like without such mutilation as would clearly be disclosed.

I have shown in Figs. 1, 2 and 3 and described the exterior abutment as provided by the walls of a pentagonal recess. This arrangement provides a differential or hunting action permitting a fine adjustment of the bolt. Thus, given the hexagonal head and the pentagonally arranged exterior abutment, as shown, it will be clear from Fig. 1 that if the annulus 20 were turned clockwise through an angle of 72° so that the side which is vertical and at the right in the figure were engaged with the lower right-hand side of the recess, the interior hexagonal periphery of the annulus would then fit the hexagonal head of the bolt in a position corresponding to a rotation thereof of 12° clockwise from that shown in the drawing, and, in general, that the annulus may be applied to the bolt at increments of adjustment of every 12° of rotation. This hunting or differential action may be availed of whenever the arrangement of exterior locking surfaces corresponds to the sides of a polygon, the number of sides of which is different from and other than a sub-multiple of the number of flats or other symmetrically disposed, non-centric, engaging surfaces of the bolt head.

In the modification shown in Figs. 4, 5 and 6, the dished annulus 20a is provided with a hexagonal inner periphery as before, but for interlocking it with the work the outer periphery is provided with the openings 24, herein in the form of notches, for engagement with a suitable radially remote abutment on the work, herein illustrated as a pin 26. The abutment-receiving notches 24 are herein shown as pentagonally arranged and may receive one or more pins, one only being illustrated in the drawing. The annulus is flattened as to lock it, as shown in Fig. 6, and in the case where only one pin is used, evidently the stress of the annulus must be against the head 12 of the bolt. The pentagonal arrangement of the notches 24, and of the locking abutments if more than one are present, permits the hunting action above described although, if desired, the opening to receive the pin might be extemporaneously formed in desired position, particularly if a single pin is relied upon.

In Figs. 7 to 9 the annulus 20b is of smooth circular exterior circumference with the center cut away to receive the hexagonal bolt head. Inwardly of the outer periphery the metal is cut away to receive the abutments 28, herein in the form of projections formed on the work-piece 16 and shown as taking the form of projections arranged at points corresponding to the sides of a regular pentagon. These openings are herein provided by slotting the annulus inwardly from the central opening in the form of five equally spaced grooves, leaving the intervening portions of the inner periphery as projecting tongues having inner ends adapted to make line contact with the flats of the head. The annulus is slipped into the position shown in Fig. 8 by a movement of axial approach as before and is flattened to the position in Fig. 9, placing the same under radial stress exerted between its unbroken outer zone and the head of the bolt.

In the drawing I have illustrated the initially dished washer as being applied in all instances with the concave side down, but under proper conditions it could equally well be applied with the convex side down.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. In combination with a bolt having a head with a non-circular peripheral portion and a part against which the head is set up, means for locking the head against rotation relatively to said part comprising an initially dished annulus at least a portion of its inner periphery of a non-circular form corresponding to said portion of the head, the annulus being adapted to be freely positioned in encircling relation about said head by a movement of axial approach, means outward of the head for non-rotatably engaging the annulus with said part, the annulus so positioned and engaged being capable of axial compression to place it under radial stress against at least the bolt head.

2. In combination with a bolt having a polygonal head and a part to which it is applied presenting a polygonal ridge facing the head, an initially dished annulus having inner and outer polygonal peripheries similar to the contours of the head and ridge and of approximately like size, said annulus adapted freely to be positioned between the head and ridge and capable of axial compression to lock it in position by radial stress against at least one of them.

3. In combination with a bolt having a polygonal head and a part to which it is applied presenting a linear ridge radially outward of the head and facing toward the same, an initially dished annulus adapted to fit freely in embracing relation to the head and interiorly conforming in contour thereto and having exteriorly a flat for presentation to said ridge, the annulus being capable of axial compression to lock it in position by radial stress against at least the head.

4. In combination with a bolt having a polygonal head, an initially dished annulus having inner and outer polygonal peripheries, the inner similar to the head and the outer having a number of sides different from the number of sides of the head and from a submultiple thereof, a part to which the bolt is applied having a linear abutment homologous to a side of the outer polygon when the annulus is in position about the bolt, said annulus adapted freely to be positioned between head and abutment and capable of axial compression to lock it in position by radial stress against at least one of them.

5. In combination with a bolt having a polygonal head and a part to which it is applied having a projection radially outward of the head, an initially dished annulus constructed to be positioned in embracing position about the head and having flats on its inner periphery to engage flats of the head and having its outer periphery notched to engage the projection, said annulus being capable of axial compression to lock it in position by radial stress against at least the head, the internal flats being equal in number to the flats of the head and the periphery having a number of notches other than the number of flats or a sub-multiple thereof.

6. In combination with a bolt having a polygonal head and a part to which it is applied having a projection radially outward of the head, an initially dished annulus constructed to be positioned in embracing position about the head and having flats on its inner periphery to engage flats of the head and having outwardly thereof a recess to embrace said projection at least in part, said annulus being capable of axial compression to lock it in position by radial stress against at least the head.

7. In combination with a bolt having a polygonal head and a part to which it is applied having a projection outward of the head, an initially dished annulus constructed to be positioned in embracing position about the head and having flats at its inner periphery to oppose the flats of the head and being recessed inwardly from said periphery to provide an opening to pass the projection, said annulus being capable of axial compression to lock it in position by radial stress against the head.

8. In combination with a bolt having a head with a non-circular periphery and a part to which it is applied having a projection outward of the head, means for locking the bolt head against rotation comprising an initially dished annulus constructed to be positioned in embracing relation about the head by a movement of axial approach, the interior of the annulus presenting tongues having end portions for non-rotation with the side of the head when pressed radially inward toward the same, the tongues defining at least one recess to pass the projection, the annulus being capable of axial compression to place it under radial stress against the side of the head.

9. In combination with a bolt having a head with a non-circular peripheral portion and a part against which the head is set up, means for locking the head against rotation relatively to said part comprising an initially dished annulus, at least a portion of its inner periphery of a non-circular form corresponding to said portion of the head, the annulus being adapted to be freely positioned in encircling relation about said head by a movement of axial approach, means outward of the head for non-rotatably engaging the annulus with said part comprising opposed abutments between which at least a portion of the annulus may be received, the annulus so positioned and engaged being capable of axial compression to place it under radial stress against at least the said abutments.

10. In combination with a bolt having a polygonal head and a part to which it is applied having radially outwardly of the head opposed projections between which at least a part of the annulus hereinafter mentioned is received, an initially dished annulus constructed to be positioned in embracing position about the head and having flats on its inner periphery to engage flats of the head and having its outer periphery notched to engage at least one of said projections, said annulus being capable of axial compression to lock it in position by radial stress against at least the projection.

11. In combination with a bolt having a polygonal head and a part to which it is applied having radially outwardly of the head opposed projections between which at least a part of the annulus hereinafter mentioned is received, an initially dished annulus constructed to be positioned in embracing position about the head and having flats on its inner periphery to engage flats of the head and having outwardly thereof at least one recess to embrace one of said projections at least in part, said annulus being capable of axial compression to lock it in position by radial stress against at least said projections.

JOHN W. GEDDES.